United States Patent [19]

Cerminara

[11] Patent Number: 4,977,581
[45] Date of Patent: Dec. 11, 1990

[54] MULTIPLE FREQUENCY CLOCK SYSTEM

[75] Inventor: Dominic Cerminara, Horsham, Pa.

[73] Assignee: Unisys Corporation, Blue Bell, Pa.

[21] Appl. No.: 233,396

[22] Filed: Aug. 18, 1988

[51] Int. Cl.⁵ .............................................. H04L 7/00
[52] U.S. Cl. .................................... 375/107; 364/131
[58] Field of Search ...................... 375/106, 107, 109;
370/103, 110.1; 328/105, 63, 72, 74, 75;
364/131, 136; 307/440, 441; 340/870.14

[56] References Cited

U.S. PATENT DOCUMENTS

| | | | |
|---|---|---|---|
| 3,921,079 | 11/1975 | Heffner et al. | 328/105 |
| 3,961,270 | 6/1976 | Ullmann et al. | 375/107 |
| 4,330,826 | 5/1982 | Whiteside et al. | 364/200 |
| 4,412,342 | 10/1983 | Khan et al. | 375/107 |
| 4,677,614 | 6/1987 | Circo | 370/103 |
| 4,692,932 | 9/1987 | Denhez et al. | 375/107 |
| 4,696,019 | 9/1987 | Tulpule et al. | 375/107 |
| 4,807,256 | 2/1989 | Yamanaka et al. | 375/106 |

FOREIGN PATENT DOCUMENTS

86/03090  6/1986  World Int. Prop. O. .......... 375/107

Primary Examiner—Douglas W. Olms
Assistant Examiner—Stephen Chin
Attorney, Agent, or Firm—John B. Sowell; Mark T. Starr; Thomas J. Scott

[57] ABSTRACT

A plural clock system for multiple processor configurations is provided which comprises one clock system for each processor. Each pre-synchronized clock system has a strobe unit and multi-phase output generator. Each multi-phase output generator has a strobe input signal, a plurality of phase output signals and an expansion sync output signal. One of the clock systems employs its oscillator as the master oscillator for the master plural clock system and the other pre-synchronized clock systems are coupled to, and synchronized by the expansion sync output signals of other clock systems.

15 Claims, 2 Drawing Sheets

MULTIPLE FREQUENCY CLOCK SYSTEM

BACKGROUND OF THE INVENTION

1. Field of the Invention

This invention relates to clock circuits of the type employed to synchronize operations in a mainframe computer. More particularly, the present invention relates to multiple clock circuits for multiple mainframe computers that are synchronized together so that they are capable of communicating with each other in real time.

2. Description of the Prior Art

It is well known that central processing units (CPU's) have been connected in clusters and operated in a distributed processing manner so that they require master clocks. Heretofore, one of the master clocks of a plurality of CPU's in a cluster configuration has been employed as the master clock for synchronizing other computers in the cluster. However, problems have arisen with delays of the clock pulses in the signal lines leading to the other computers and when a single clock is employed high power drivers are required to drive the clock signal load.

It has been suggested that individual clock circuits with individual drivers be supplied at each of the computers in a cluster configuration and that the clock circuits at the individual CPU's be synchronized by a master oscillator so that the aforementioned problems with the delay of the clock signals in signal lines and high power driver requirements can easily be overcome at the individual computers.

Another problem arises at the individual clock boards at the individual computers. The duration of the phases of the clock is theoretically precise and accurate, however, it has been found that the prior art method of employing cascaded flip-flops to generate different phases of the clock signal do not generate accurate time period windows for the clock phases. For example, an 80 nanosecond clock having four phases would require that the duration of each phase last exactly 20 nanoseconds without overlap or separation. Due to process variation in manufacturing the semiconductors used for the flip-flops, voltage variations at the semiconductors and temperature variations of the environment, the 20 nanosecond windows have been found to vary in excess of 10% when an acceptable variation of less than 2% is required in a high speed computing system to prevent system malfunction. Computer manufacturers, more than five years ago, did not incur this problem because the clock rates were relatively low. Today's high speed computers require that the logic and clock circuits be embodied in the form of large scale or very large scale integrated circuits, thus, when a clock circuit that is otherwise operable but is not acceptable because of pulse durations or frequency durations of the clock (or the phases of the clock), the whole semiconductor device having the clock circuits is not acceptable. Further, if the semiconductor device on which the clock circuit is located is embodied into a component, subcomponent or board and the unacceptable time variations of the clock (or phases of the clock) are not discovered until after assembly, the whole assembly must be either reworked or scrapped.

It would be extremely desirable to provide a simplified clock circuit which may be incorporated into a semiconductor chip with other logic circuits which is not subject to time duration variations caused by variations in temperature environment or voltage supply.

SUMMARY OF THE INVENTION

It is the principal object of the present invention to provide a universal pre-synchronized clock circuit for installation in CPU's that are connected in a multiple computer configuration.

It is another principal object of the present invention to provide an extremely reliable and accurate high speed multiple phase clock circuit.

It is another principal object of the present invention to provide a simplified pre-synchronized clock circuit which may be implemented in more than one semiconductor process technology.

It is another principal object of the present invention to provide a universal pre-synchronized clock circuit which may be implemented in more than one frequency by merely changing the interconnections to the logic gates between the input and output shift registers.

It is another object of the present invention to provide a novel clock circuit which is pre-synchronized at the output shift register by the leading edge of the clock at the leading edge of the phases of the clock.

It is another object of the present invention to provide a universal pre-synchronized clock circuit which embodies a strobe unit for receiving a master clock signal and a multi-phase generator coupled to the strobe unit for producing pre-synchronized phase output signals.

It is a general object of the present invention to provide a universal simplified clock circuit which may be incorporated into high speed mainframe computers that require multi-phase and/or multi-frequency clock signals.

According to these and other objects of the present invention, there is provided a multi-phase clock system for installation into computers connected in a multiple computer configuration. Each clock system in each computer is provided with strobe unit and a multi-phase generator unit. Each strobe unit receives a sync signal input and provides a data strobe output signal which is applied to its multi-phase generating unit. The master multi-phase clock systems employs its oscillator as the master oscillator for synchronizing the output of all of the other clock systems. Further, the master clock system provides an expansion sync output signal for synchronizing another clock system and the other clock system provides another expansion sync signal for synchronizing yet another clock system of the multiple computer configuration.

DESCRIPTION OF THE PREFERRED EMBODIMENT

Figure 1:
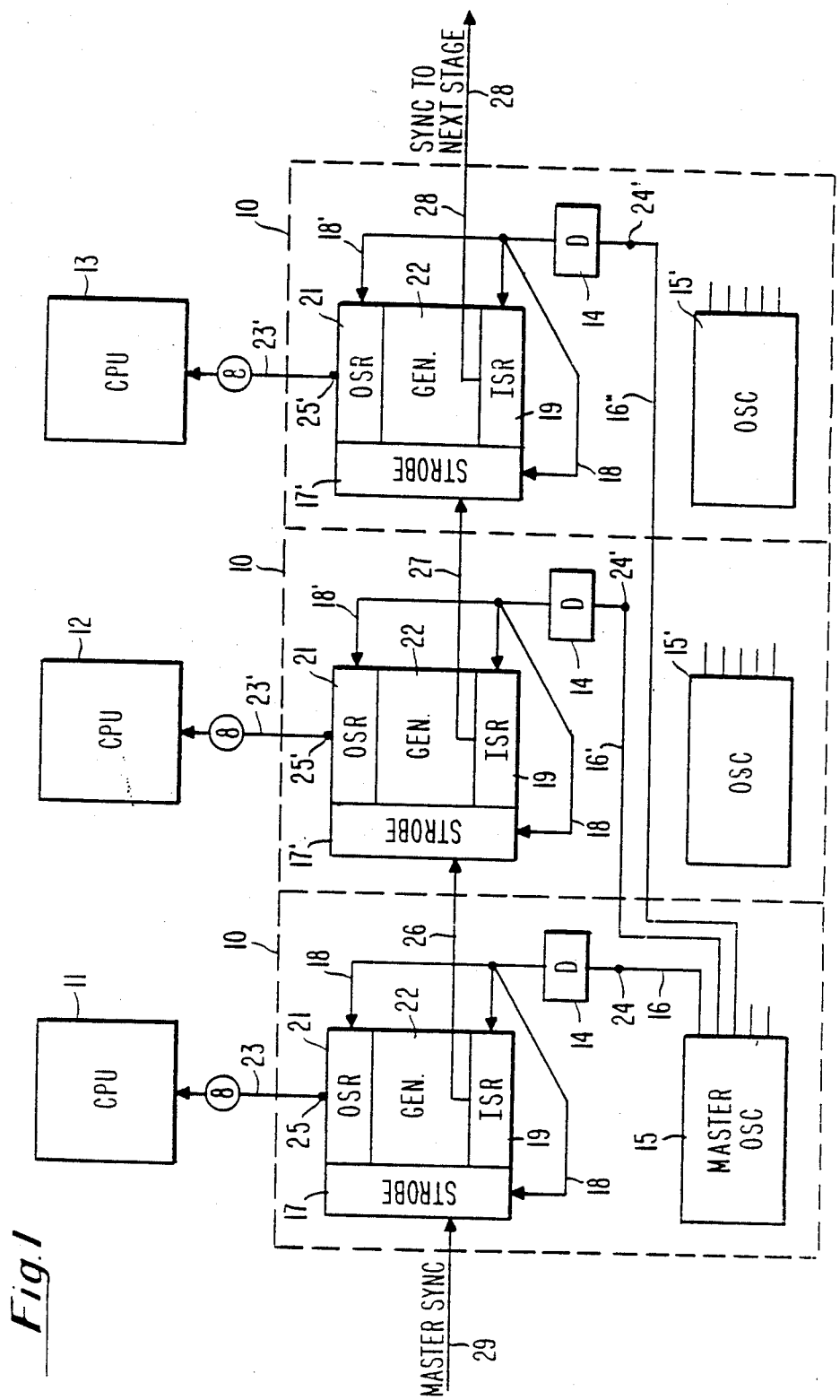
FIG. 1 is a block diagram of the present invention showing a plurality of processors connected in a multiple computer configuration which operates as a synchronous system.

Refer now to FIG. 1 showing a clock system 10 of the type employed in each of the CPU's 11, 12 and 13. Each of the clock systems 10 is preferably implemented in the form of logic circuitry on semiconductor chips such as large scale integrated circuits or very large scale integrated circuits with other logic. As will be explained hereinafter the multiprocessors sync delays 14 and crystal controlled oscillators 15 are not a part of the logic chips and are mounted in close proximity thereto. In the preferred embodiment shown, the clock control circuits 10 are manufactured as insertable components into the CPU's 11, 12 and 13. The oscillator 15 of the left most clock circuit 10 is labelled the master oscillator eve though any of the oscillators could be selected as the master oscillator for the multiprocessor configuration. Only one master oscillator 15 is employed to synchronize as many as six mainframe computers without requiring additional amplifiers and drivers. Thus, it will be understood that the slave oscillators 15' be disabled in the preferred embodiment mode of operation. The master oscillator 15 is designed to provide a high frequency signal which operates at the extreme limits of switching logic elements in the type of circuit to be driven in the CPU's. For 0 example, if the CPU's employ ECL circuitry, the master oscillator may be driven up to 100 megahertz. If the CPU to approximately 40 megahertz. If the CPU's 11, 12 and 13 have combined TTL and ECL circuitry, then the master oscillator 15 provides the higher frequency required and lower frequencies are provided by step down logic circuitry.

The high frequency master oscillator output signal on line 16 is applied directly to delay 14 to produce a synchronized clock delay signal output on line 18 which is applied to the strobe unit 17 as well as to the input shift register 19 (TSR) and output shift register 21 (OSR) of the multi-phase generator unit 22. The phases of the clock are provided on eight output lines 23 and are synchronized by the clock on line 18. As will be explained hereinafter, the plurality of signals on lines 23 may be multi-phase and multi-frequency depending on the interconnections of the logic in multi-phase generator 22.

The preferred embodiment clock system 10 when manufactured is precisely calibrated so that the time delay from node 24 at the input of the delay 14 to the node 25 at the output of output shift register 21 is a predetermined exact figure on each of the systems 10 incorporated into the multiple processors. The oscillator output lines or cables 16, 16' and 16", from the master oscillator 15 are designed to be of equal length or equal delay so that the clock signals arriving at the nodes 24 or 24' are in exact time synchronization. Since the delay from node or 24' to node or 25' is calibrated when the clock system 10 is made, all of the phase output signals on lines 23 and 23', as the case may be are also in exact synchronization. Multiple outputs are provided at the different oscillators 15 and 15' so that the output of the selected single master oscillator 15 may be connected to the nodes 24 at the inputs of the different clock systems 10. Expansion sync output lines 26 connects the output of the input shift register 19 of the left-most CPU's multi-phase generator 22 to the input of the next CPU 12 stage's strobe units 17'. In a similar manner, expansion sync line 27 from the clock system 10 of CPU 12 is connected to the input of the strobe unit 17' of the third stage computer 13. The expansion sync signal on line 28 from the input shift registers 19 of the clock system of CPU 13 will be applied to the strobe unit of the next stage computing system (not shown).

Figure 2:
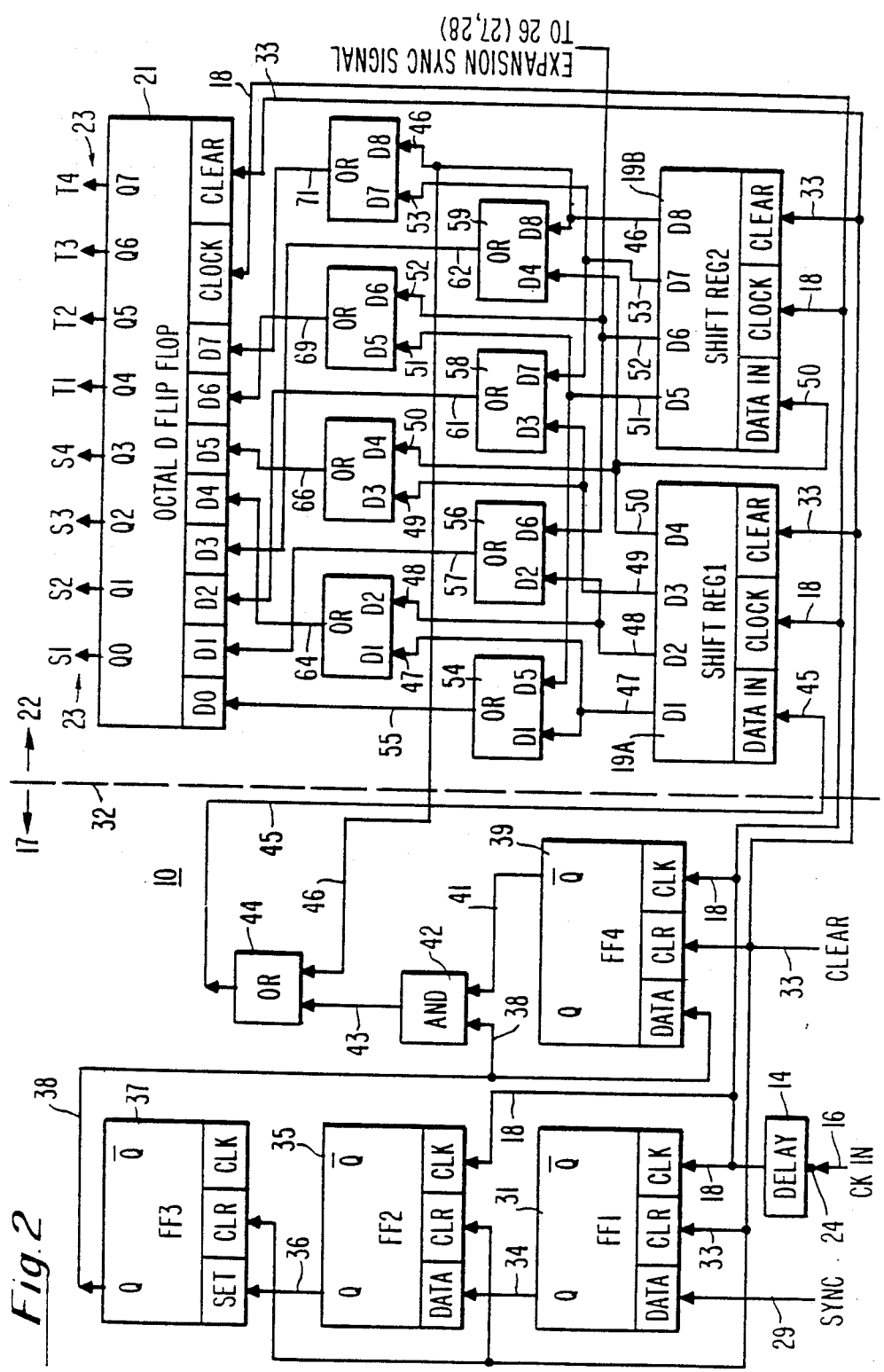
FIG. 2 is a detailed block diagram of one of the clock systems employed in each of the processors of the FIG. 1 embodiment.

Refer now to FIG. 2 showing a detailed block diagram of one of the preferred embodiment clock systems 10 of the type employed in each of the processors 11 to 13 etc. For purposes of explaining the present invention, a two-frequency, four-phase generator 22 will be explained hereinafter. It will be understood that the same frequency may be supplied on all of the phase output lines 23 or as many as three different frequencies maybe provided. The present invention while employing eight phase output lines may be expanded to additional phases employing the same invention by expanding the input shift registers and output shift registers. Assume that the sync line 29 to the data input of flip-flop 31 is the same as the master sync signal on line 29 of FIG. 1 being applied to the strobe unit 17. The strobe unit 17 is shown to the left of phantom line 32 in FIG. 2 and the phase generator portion 22 of the clock system 10 is shown to the right of phantom line 32. The master sync signal on line 29 is only applied to the left most clock system 10 of CPU 11 during power up or start up. As will be explained hereinafter, the sync signal being applied to the strobe units 17' etc. of the other clock systems will be supplied by the expansion sync signals on lines 26, 27 and 28 as the case may be. Also, on power up the oscillator output signal on line 16 is being applied to the input mode 24 of the delay 14 to produce the delayed output oscillator clock signals on line 18 which are applied to the strobe unit 17 and to the input shift register 19 and to the output shift register 21 of the multi-phase generator 22. When the clear signal on line 33 that was produced during power up is removed, the next following clock signal on line 18 produces a T-0 clock signal on line 34 from the Q output of flip-flop 31. Thus, the leading edge of the clock signal on line 18 establishes the leading edge of the T-0 signal which remains high after the first clock signal on line 18. The high level signal on line 34 is applied to the data input of flip-flop 35 to establish at its Q output on line 36 the T-1 clock reference signal at the next following clock time. The leading edge of the T-1 clock signal on line 36 is applied to the set input of flip-flop 37 which has no clock input, thus, the signal in line 36 appears as an output on line 38 delayed only by the logic delay of flip-flop 37. The signal on line 38 which occurs shortly after the leading edge of the T-1 signal, is applied as a data input to flip-flop 39 which has a clock input from line 18. Thus, the next following clock signal produces a low active signal at the NOT Q output of flip-flop 39 at T-2 clock time. The leading edge of the T-2 signal on line 41 is applied to AND gate 42 along with the delayed T-1 signal on line 38 to produce a pulse on line 43 having its leading edge starting at clock time T-1 and its trailing edge terminated at clock time T-2. The strobe pulse on line 43 is applied to OR gate 44 to produce the initial data strobe pulse on line 45 which is applied to the multi-phase generator of clock system 10 of FIG. 2. The initial data strobe signal on line 45 which occurs between leading edges of of times T-1 and T-2 is applied as a data input to the input shift register 19A. The clock signal on line 18 at the input of register 19A has its leading edge of clock signal T-2 occurring during the overlap trailing edge time of the data strobe pulse on line 45. The reason the trailing edge of the data signal on line 45 occurs at the leading edge of the T-2 clock signal on line 18 is because of the logic delay in AND gate 42 and OR gate 44. While this is a very narrow time window, it is sufficient to have set up the data input at the time of the clock arrival.

The first data pulse on line 45 at shift register 19A causes a signal to appear at the output of the shift register 19B on line 46. The output of the 8 stage shift registers 19A and 19B on line 46 is applied as an input to OR gate 44 to produce an end around shift register signal on line 45 which is applied to the data input of shift register 19A and again produces an output signal as every leading edge of the next following clock signal. The data output on line 47 from the D-1 stage of shift register 19A stays high from time T-2 to T-3. Similarly, the data output signal on line 48 from stage D-2 of shift register 19A stays high for only one clock time and remains low for seven clock times. Thus, the data output on lines 47 to 53 and 46 from the stages D-1 to D-8 create unique pulses of time duration which remain high for only one clock time. Since the output of stage D-4 of shift register 19A is coupled to the data input of shift register 19B, the two shift registers 19A and 19B operate as a single 8 stage shift register.

Output shift register 21 is shown as an octal D flip-flop having 8 data inputs, a clock input connected to the master clock signal on line 18 and a clear input connected to the master clear signal 33 which is cleared on power up. The signal on line 47 is incurring between clock times T-2 and T-3 and as applied to the input of OR gate 54. Similarly, the second input to OR gate 54 from shift register stage D-5 on line 51 is applied to OR gate 54 to produce a signal at the output of OR gate 54 on line 55 which occurs during T-2 to T-3 clock time and again at T-6 to T-7 clock time. Thus, the signal on line 55 occurs twice during eight clock times which will produce the first desired frequency. Assume that the siqnal on line 55 is at phase one and at frequency one then the output from OR gate 56 on line 57 occurs at phase two and at frequency one. Similarly, the output of OR gates 58 and 59 on lines 61 and 62 occur at phase three and four at frequency one time. The input on line 47 and 48 to OR gate 63 occur during the time duration T-2 to T-4, thus the outputs at stages D-1 and D-2 are continuously high during T-2 to T-4 clock time as an output on line 64 and at all other clock times are low. Thus, the output on line 64 may be considered to be at phase one having a frequency two. Similarly, the output of OR gates 65 on lines 66 occurs a phase two and frequency two. Thus, the outputs from OR gate 67 and 68 on line 69 and 71 are occurring at the second frequency during phase three and phase four time. The first frequency signals on lines 55, 57, 61 and 62 are applied to the stages D-0 to D-3 of the output shift register 21 to produce unique phase and frequency output signals on output lines 23 shown as S-1 to S-4. The signal at output line S-1 occurs during the clock time duration T-3 to T-4 and the output clock signal on lines S-2 occurs during time T-4 to T-5, etc. These first frequency clock signals during phases F-1 to F-4 are synchronized by the original master clock signal 18 applied at the clock input of output shift register 21.

In a similar manner, the second frequency signals on lines 64, 66, 69 and 71 are applied to the stages D-4 to D-7 of the output flip-flop 21 to produce unique F-2 frequency output signals during phases one to four. The phase one output signal on line T-1 occurs during clock time T-3 to T-5 and the phase two output signal on line T-2 occurs during clock time T-5 to T-7 etc. etc. providing a four phase clock output signal at a second frequency. Since the phase four output signal on line T-4 occurs during clock time T-9 to T-1 1, it in fact, is occurring during the next shift register cycle time at times T-1 to T-3.

The output signal on line 52 from stage D-6 is occurring at clock time T-7 to T-8 as explained hereinbefore. This clock signal is not only applied to OR gates 56 and 67 but is employed as an expansion sync signal to be applied as a sync input to one of the strobe units 17, 17', etc. For example, assume that the FIG. 2 clock system is the master clock system and has a master sync input on its line 29, thus, its output line from the input shift registers, shown as line 26 in FIG. 1, is applied to the strobe unit 17' of the clock system of CPU 12. However, if the clock system 10 shown in FIG. 2 is the clock system for the second CPU 12 shown in FIG. 1, its input strobe signal on line 29 would, in fact, be an input strobe signal from the previous clock system shown as the expansion strobe signal on line 26 in FIG. 1. Instead of a line 29 input would be a line 26 input to flip-flop 31. Similarly, the expansion sync signal output, assuming that the clock system 10 is for CPU 12, would produce the expansion sync signal for line 27 shown in FIG. 1. Thus, each successive clock system 10 provides the expansion sync signal for the next following clock system 10 until all clock systems receive either a master sync signal or an expansion sync signal which is unique from each other. When the clear signal on line 33 is generated on power up, it is applied to all of the multiple CPU's but is it unknown will which CPU will clear first. By chaining or cascading the clock systems 10 and having each successive clock system 10 after the master clock system 10 produce an expansion sync signal for the next clock system, every clock system will be synchronized and all phase ones will be occurring simultaneously as soon as the last clock system is activated.

In the preferred embodiment shown, it is possible that the master CPU repeats its phase cycles several times before the last CPU is brought on to line and synchronized.

Having explained a preferred embodiment arrangement of cascading or chaining the clock systems, it will be understood that the master clock system may be employed as a single master to synchronize and start up all of the slave or expansion clock systems simultaneously. By synchronizing the master clock system first, all of the multiple computers in the system configuration will be forced into synchronization with the master clock system.

Having explained a dual frequency and a four-phase multi-phase generator, it will be understood that it is possible to expand the input and output shift registers 19 and 21 to produce additional phases and by selecting the pulse duration times at the output of the input shift register 19, additional phases at additional frequencies may be selected. Further, employing only OR gates of the type shown in FIG. 2, it is possible to produce two pulses in close proximity to each other at different frequencies. For example, if we OR stages D-1 and D-3 together we will produce a pulse on output line S-1 which occurs at T-3 to T-4 clock time and again at T-5 to T-6 clock time every eight clock times.

By employing an output shift register synced with the original clock signal as an input, the outputs which occur from the output shift register 21 are deskewed and resynchronized at each of the individual processors. Deskewing is an important feature. If the output signals from register 21 require additional power or additional fan out, then drivers may be placed in the output lines from register 21. However, any skewing that would occur since the pulses are basically reshaped and reclocked is the skew which would result from the driver.

Another important feature of the present invention is that the multi-phase generator 22 is synchronized to the master clock signal at the input and output shift registers 19 and 21 and is not affected by any delay or skewing or timing caused by the logic delays and flip-flops 31, 35, 37 and 39 as occurred in the prior art cascade flip-flop phase generators. Stated differently, the data signal on lines 38 and 41, which generate the start of the T-0 clock, only incur logic delays of AND gate 42 and OR gate 44 which is less than 10 nanoseconds using present state-of-the-art semiconductor technology.

Employing TTL state-of-the-art technology it is possible to run the master oscillator at rates up to 40 megahertz frequency. Employing ECL present technology, it is possible to run the master oscillator up to about 100 megahertz frequency. However, if the output shift register 21 employs TTL technology and the remainder of the clock system is ECL technology, the limits on set up time require that the master clock oscillator be operated near the lower frequency at around It will be understood that a ECL to TTL 50 megahertz. It will be understood that a ECL to TTL translator will be required at the input lines to the data stages of shift register 21 when such dual semiconductor technologies are combined in the same clock system. While it is not a preferred embodiment it will be understood that the clock system 10 shown in FIG. 2 may be implemented in small scale integrated technology employing descrete components and that the preferred OR gate logic circuitry can be implemented on a separate chip so that different phases and different frequencies can be obtained from the output of the output shift register by merely selecting the correct chip of OR gate logic circuits. Even in this case the input and output shift registers are synchronized by the clock signal on line 18 so that the accuracy of the phases and frequency without deskewing is still preserved.

What is claimed is:

1. A synchronous clock system for multiple processor configurations, comprising:
a plurality of clock systems, one for each processor, each providing multi-phase clock output signals,
each clock system having its own strobe unit and a multi-phase generator unit,
each strobe unit having a sync signal input and a data strobe output,
each said multi-phase generator unit having a strobe input, a plurality of phase signal outputs and an expansion sync output,
one of said clock systems being the master clock system having a master sync signal input which originates upon a system power ON condition and having a master expansion sync output, and
the other ones of said plurality of clock systems being slave clock systems, one of which has its strobe input coupled to the master expansion sync output of said master clock system and the other ones of said slave clock systems each having its strobe input coupled to an expansion sync output of another one of said slave clock systems.

2. A clock system as set forth in claim 1 wherein the plurality of clock systems are greater than two,
and wherein said master expansion sync output is coupled to the sync signal input of a second clock system and the expansion sync output of said second clock system is coupled to the sync signal input of a third clock system.

3. A clock system as set forth in claim 2 which further includes master oscillator means coupled to each of said clock systems.

4. A clock system as set forth in claim 3 wherein said master oscillator means provides output clock signals coupled to the input of said strobe units and to the input and output of said multi-phase generator units.

5. A clock system as set forth in claim 1 wherein each of said strobe units comprises a plurality of flip-flops coupled in series.

6. A clock system as set forth in claim 5 wherein said plurality of flip-flops comprises four flip-flops coupled in series.

7. A clock system as set forth in claim 6 wherein the outputs of the third and fourth flip-flops of said plurality of flip-flops are connected to the input of an AND gate to provide a data strobe signal output.

8. A clock system as set forth in claim 7 wherein said multi-phase generator unit is provided with an input end around shift register coupled to said data strobe signal output from said strobe unit.

9. A clock system as set forth in claim 8 wherein said multi-phase generator units further includes an output shift register coupled to said input end around shift register to provide said multi-phase clock output signals.

10. A clock system as set forth in claim 9 wherein all of the multi-phase clock output signals from said output shift register have the same base frequency output.

11. A clock system as set forth in claim 9 wherein half of the output multi-phase clock signals are at the same base frequency and the other half of the clock signals are at twice the base frequency.

12. A clock system as set forth in claim 9 wherein one quarter of the output multi-phase clock signals at the output of said output shift register are the base frequency and one quarter are at twice the base frequency and one quarter are at four times the base frequency.

13. A clock system as set forth in claim 9 wherein said master oscillator means frequency is between 30 and 50 megahertz.

14. A clock system as set forth in claim 9 wherein said input and output shift registers of said multi-phase generator unit are coupled through logic OR gates to provide a desired frequency output of said multi-phase clock signals.

15. A clock system as set forth in claim 4 wherein said master oscillator means is coupled to the output of said multi-phase generator to provide deskewed multi-phase output clock signals.

* * * * *